(12) United States Patent
O'Kell et al.

(10) Patent No.: US 12,208,898 B2
(45) Date of Patent: Jan. 28, 2025

(54) LIGHTING SYSTEM FOR AIRCRAFT

(71) Applicant: STG Aerospace Limited, Cwmbran (GB)

(72) Inventors: Sean Patrick O'Kell, Cwmbran (GB); Andrew Jon Hallett, Cwmbran (GB)

(73) Assignee: STG AEROSPACE LIMITED, Cwmbran (GB)

( * ) Notice: Subject to any disclaimer, the term of this patent is extended or adjusted under 35 U.S.C. 154(b) by 0 days.

(21) Appl. No.: 18/663,919

(22) Filed: May 14, 2024

(65) Prior Publication Data
US 2024/0400202 A1   Dec. 5, 2024

(30) Foreign Application Priority Data

Jun. 2, 2023   (GB) ..................... 2308292

(51) Int. Cl.
| | |
|---|---|
| *B64D 11/00* | (2006.01) |
| *B64D 45/00* | (2006.01) |
| *F21V 8/00* | (2006.01) |
| *F21V 21/08* | (2006.01) |

(52) U.S. Cl.
CPC ............. *B64D 11/00* (2013.01); *B64D 45/00* (2013.01); *F21V 21/08* (2013.01); *G02B 6/0051* (2013.01); *G02B 6/0068* (2013.01); *B64D 2011/0038* (2013.01); *B64D 2045/007* (2013.01); *B64D 2203/00* (2013.01)

(58) Field of Classification Search
CPC ................ B64D 11/00; B64D 45/00; B64D 2011/0038; B64D 2045/007; B64D 2203/00; G02B 6/0051; G02B 6/0068; G02B 5/36; G02B 5/38; F21S 4/22; F21S 4/24; F21S 4/26; F21W 2107/30; G09F 2013/05; G09F 13/20; G09F 2019/225; F21V 21/0808; F21V 33/0076; B60Q 3/46; B65D 45/00; F21L 4/00; F21L 4/02
See application file for complete search history.

(56) References Cited

U.S. PATENT DOCUMENTS

| | | | |
|---|---|---|---|
| 4,365,232 A | 12/1982 | Miller | |
| 6,472,994 B1 * | 10/2002 | Tator | F21S 9/022 340/332 |
| 9,386,638 B2 * | 7/2016 | Trinschek | B60Q 3/46 |

(Continued)

FOREIGN PATENT DOCUMENTS

| | | |
|---|---|---|
| GB | 2 618 137 A | 11/2023 |
| JP | 2005-331553 A | 12/2005 |
| WO | WO-2019/028181 A1 | 2/2019 |

*Primary Examiner* — Erin Kryukova
(74) *Attorney, Agent, or Firm* — FOLEY & LARDNER LLP

(57) ABSTRACT

An aircraft cabin lighting system comprises one or more cabin lighting units, each cabin lighting unit comprising an emergency exit sign arranged to be electrically illuminated using an aircraft electricity supply connected thereto; and one or more internally-powered emergency exit signs. The internally-powered emergency exit signs are portable, and each comprise an adhesive layer arranged to allow the internally-powered emergency exit sign to be adhered to a surface. The signs are arranged to be adhered to a surface in the vicinity of the connected electrical emergency exit sign in use, and do not require any external source of electricity to function.

20 Claims, 6 Drawing Sheets

(56) References Cited

U.S. PATENT DOCUMENTS

| | | | | |
|---|---|---|---|---|
| 2005/0141226 A1* | 6/2005 | Wisch | ................... | B64D 11/00 |
| | | | | 340/693.1 |
| 2010/0033980 A1* | 2/2010 | Vogel | ...................... | B60Q 3/46 |
| | | | | 313/504 |
| 2013/0199064 A1* | 8/2013 | O'Kell | ................... | G09F 13/42 |
| | | | | 40/542 |
| 2018/0096634 A1* | 4/2018 | Walker | ..................... | F21V 3/02 |
| 2021/0291727 A1* | 9/2021 | Edquist | ................... | B60Q 3/46 |

\* cited by examiner

LIGHTING SYSTEM FOR AIRCRAFT

CROSS-REFERENCE TO RELATED PATENT APPLICATIONS

The present application claims priority to and the benefit of United Kingdom Patent Application No. 2308292.8, filed Jun. 2, 2023, the entire disclosure of which, including the specification, drawings, claims, and abstract, is incorporated herein by reference.

BACKGROUND

The present invention relates to emergency exit lighting systems in aircraft, and in particular to methods for handling failure of one or more emergency exit signs, and to aircraft cabin lighting systems arranged to allow such a failure to be dealt with without grounding of the aircraft for a prolonged time period.

Such signs may be used to assist passengers in escaping from aircraft in an emergency situation, in particular by allowing the exits to be identified even if issues such as smoke or an electrical fault with other cabin lighting systems are interfering with visibility. Emergency exit signs are generally connected to an emergency, or back-up, power supply such that they still receive electricity even if the general cabin lighting circuit fails. The quantity and location of smoke, among other factors, may influence where people look for signs—both high-level and low-level signs may be used, optionally in addition to floor-path markings and/or seat-mounted electrical lights. The skilled person would appreciate that the use of both high and low level signs is mandatory for many aircraft. It will be appreciated that many emergency exit signs in aircraft cabins are positioned relatively low, near the floor of the cabin, and may therefore be described as low-level lighting systems. Such signs may be provided as part of an escape system configured to guide people towards and to identify an exit, for example combined with floor-path marking. High-level markings may be provided in addition, for example as progression signs directing viewers towards a nearest exit. Such high-level markings may need to be visible from a longer distance than low level markings (e.g. around 12 meters or more as compared to 4-5 meters), for example with signs for each of two adjacent emergency exists being visible from a third emergency exit located between them.

In commercial passenger aircraft in particular, there are typically safety regulations and requirements. In aircraft cabins, it is a general requirement for all passenger aircraft to have lit emergency exit signs by all emergency exits. For example, Certification Specification 25 (CS 25) covers the regulations for large aircraft, noting in particular sections CS 25.811 and CS 25.812. If even one emergency exit sign fails (e.g. due to a bulb blowing, LED failing, or electrical fault), the aircraft may be in contravention of the standards and can be grounded until it is serviced, or forced to fly back to an engineering base empty/with no passengers if the airport at which the fault occurs is not an engineering base, or may be obliged to complete its intended flight with fewer passengers (for example, standards for maximum number of passengers per working emergency exit may mean that the number of passengers corresponding to one exit may not be allowed to fly if the exit light for an exit is out of order). Any of these eventualities can be very costly to an airline, and therefore would be desirably avoided. It will be appreciated that some signs have many individual lights, and some of those individual bulbs or LEDs may be allowed to fail without breaching Minimum Master Equipment List (MMEL) standards—for example, the standard may specify that at least three out of five bulbs in each sign must be working for the aircraft to be deemed flightworthy with passengers. A sign may therefore be described as "failing" when it drops below the minimum standard required (or drops to match the minimum standard, depending on safety rules regarding redundancy), whether or not one or more lights of that sign are still working.

SUMMARY

According to an exemplary embodiment, an aircraft cabin lighting system includes at least one cabin lighting unit, each cabin lighting unit comprising an emergency exit sign connected to an aircraft electricity supply. The aircraft cabin lighting system also includes at least one replacement emergency exit sign for temporary use. The replacement emergency exit signs each are internally-powered and portable, comprising at least one electric light source, at least one energy storage device arranged to power the at least one light source, and an adhesive layer arranged to allow the replacement emergency exit signs to be adhered to a surface, and are arranged, in use, to be adhered to a surface in the vicinity of the emergency exit sign connected to the aircraft electricity supply.

According to another exemplary embodiment, a method of providing emergency exit lighting in an aircraft cabin includes, in response to failure of an emergency exit sign connected to an aircraft electricity supply: obtaining an internally-powered emergency exit sign from storage, the internally-powered emergency exit sign comprising an adhesive layer arranged to allow the internally-powered emergency exit sign to be adhered to a surface; activating the internally-powered emergency exit sign; and applying the internally-powered emergency exit sign to a surface in the vicinity of the failed emergency exit sign such that the adhesive layer holds it in place as a replacement emergency exit sign.

According to another exemplary embodiment, a method of maintaining flight-worthiness of a passenger aircraft in instances of failure of an emergency exit sign connected to an aircraft electricity supply such that the aircraft can be flown back to a service point, the method includes, in response to the failure of an electrical emergency exit sign, obtaining an internally-powered emergency exit sign from storage, the internally-powered emergency exit sign comprising an adhesive layer arranged to allow the internally-powered emergency exit sign to be adhered to a surface; activating the internally-powered emergency exit sign; applying the internally-powered emergency exit sign to a surface in the vicinity of the failed emergency exit sign such that the adhesive layer holds it in place as a replacement emergency exit sign; completing an intended flight of the aircraft using the internally-powered emergency exit sign as a required exit sign; and servicing the aircraft to repair or replace the failed emergency exit sign in advance of a next flight of the aircraft.

BRIEF DESCRIPTION OF THE DRAWINGS

There now follows, by way of example only, a detailed description of embodiments of the present invention with reference to the accompanying drawings in which.

DETAILED DESCRIPTION

Figure 1A:
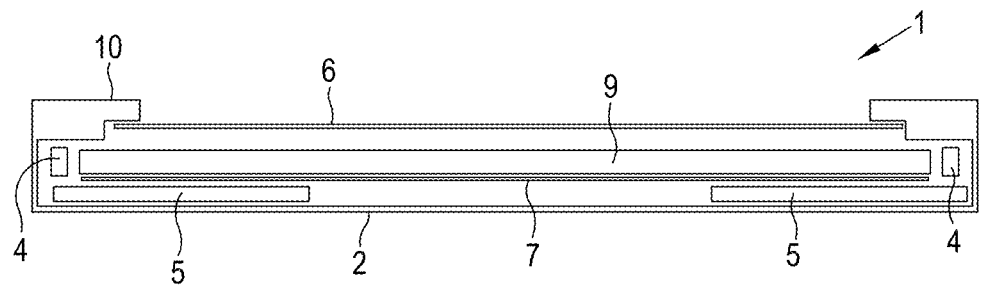
FIG. 1A is a cross-sectional view of a temporary exit sign in accordance with various embodiments of the invention.

According to a first aspect, there is provided an aircraft cabin lighting system comprising one or more cabin lighting units, each cabin lighting unit comprising an emergency exit sign arranged to be electrically illuminated (by means of a connection to an aircraft electricity supply—e.g. wires within the cabin walls; such an emergency exit sign may be referred to as an "integrated" emergency exit sign, or a "connected" emergency exit sign, or a "permanent" emergency exit sign); and one or more internally-powered emergency exit signs (which are not connected to an aircraft electricity supply—neither to standard wiring for a lighting circuit nor to a back-up power system onboard the aircraft). The internally-powered emergency exit signs each comprise at least one electric light source, and at least one energy storage device. The at least one energy storage device is arranged to power the electric light source(s) in use. The internally-powered emergency exit signs are portable, and each comprise an adhesive layer arranged to allow the internally-powered emergency exit sign to be adhered to a surface. The signs are arranged to be adhered to a surface in the vicinity of the connected electrical emergency exit sign in use.

The at least one energy storage device is arranged to provide electrical power to the at least one electric light source, so as to illuminate that light source.

The at least one energy storage device may be or comprise one or more batteries. The internally-powered emergency exit signs may therefore be battery-powered emergency exit signs.

The at least one energy storage device may be or comprise one or more ultra-capacitors.

The internally-powered sign is not intended to be a permanent fitting or fixture of an aircraft cabin (unlike the integrated emergency exit sign), but rather to be deployed when needed and removed thereafter, and may therefore be described as a "temporary" emergency exit sign.

The sign may be a single-use sign, and may be discarded after use.

Multiple temporary emergency exit signs may be used simultaneously in a particular aircraft cabin, on the same flight.

The temporary emergency exit sign is not arranged to be electrically connected to any electricity supply, such as an aircraft back-up system or main cabin wiring.

The temporary emergency exit sign may be internally powered for a single use—having integral storage for the total amount of energy needed for a single use, and being arranged to be discarded thereafter. The emergency exit sign is therefore described as being internally-powered, as its power supply is all internal, with no external supply being needed for it to function.

The temporary emergency exit signs may have no available electrical connector—they may use power only from the one or more integrated batteries and/or other internal energy storage devices.

The temporary emergency exit signs may not be designed to be rechargeable—they may be deliberately single-use to avoid risk of e.g. battery degradation over time making a re-used sign no longer compliant with safety regulations. The batteries and/or capacitors, or other suitable energy storage devices, may be sealed inside and not replaceable without damaging the sign, to reduce the risk of tampering or accidental mis-use with lower-quality batteries for example.

In other embodiments, the batteries or other suitable energy storage devices may be replaceable, or re-use may be permitted after e.g. battery re-charge and optional testing. Such signs may therefore be re-useable in some implementations, e.g. on recharging or replacement of batteries or other suitable energy storage devices and/or application of a new adhesive layer after removal of the first, or may be one-shot and disposed of after use.

The or each temporary electrical emergency exit sign may be a low level exit sign, and optionally may be: (i) located adjacent to a lower corner of an emergency exit; and/or (ii) located less than 122 cm, and optionally less than 50 cm, above a floor of the aircraft cabin.

Low-level signs may identify a specific emergency exit, in particular indicating that the emergency exit is in the immediate vicinity of the sign.

In alternative or additional embodiments, the or each temporary emergency exit sign may be a high-level exit sign, optionally located at least 122 cm above a floor of the aircraft cabin. The high-level signs may be located adjacent to a ceiling of the aircraft cabin; optionally on a side wall or on a protrusion or fitting extending downwardly from the ceiling.

High-level signs may point towards one or more emergency exits, and may be used to direct a passenger to move towards a suitable emergency exit.

The temporary signs may therefore be used as high-level exit signs when affixed to, or adjacent to, a high-level connected electrical emergency exit sign, or as low-level signs when affixed to, or adjacent to, a low-level connected electrical emergency exit sign. In some embodiments, different sign designs may be provided for the different locations—in other embodiments, the same temporary sign may be suitable for use in either location type. The temporary signs may be labelled accordingly, or may be selected to match the appearance of the failed sign to be replaced.

The or each temporary emergency exit sign may be flexible such that it can adapt to the shape of a surface to which it is applied. It will be appreciated that the battery itself/the batteries themselves (or other energy storage devices(s), as applicable) may not be flexible—battery shape, size, and positioning may therefore be selected such that the one or more batteries are located in regions intended to be kept flat in use, with the sign bending between or around the batteries. In alternative embodiments, the or each temporary emergency exit sign may be rigid, and may have a rigid frame arranged to support and protect one or more other components of the sign.

The sign may be flexible such that it can conform to a surface to which it is adhered, for example bending around corners of a fixture or fitting, or adapting to a curved wall shape.

The or each internally-powered emergency exit sign may be sized and/or shaped to cover the cabin's integrated electrical emergency exit sign when the adhesive layer is applied thereto.

The adhesive layer may be arranged to be detachable from the surface of the integrated electrical emergency exit sign, such that the internally-powered emergency exit sign can be temporarily installed, and then removed, without damaging the integrated cabin emergency exit sign. The adhesive layer may therefore be a removable adhesive, providing an easy-peel sign. Alternatively, the adhesive layer may be arranged to stick firmly to the surface such that the internally-powered sign cannot be easily removed, and optionally cannot be removed without damaging the underlying integrated sign or use of a suitable solvent. Such embodiments may decrease a risk of tampering.

The or each internally-powered emergency exit sign may comprise an exit identifier arranged to be lit by the at least one electric light source. The exit identifier may comprise one or more words and/or symbols which are: (i) illuminated on a darker background; or (ii) darker on an illuminated background.

A contrast between brightest and darkest elements may be set to be at least 10:1.

Various colors may be selected. For example, the light source may be arranged to emit one or more of red, green, blue, and white light, and/or a colored translucent or transparent layer may be inserted between a light source and a front face of the sign, or may form the front face of the sign, so as to adjust a color of the emitted light. Color may be selected based on passengers' expectations for emergency signs and/or on standards, and may vary across the face of the sign, with red (e.g. "EXIT" text, one or more arrows) and green (e.g. a running person image, one or more arrows) and white being common in current exit identifiers.

The internally-powered light source of the sign is arranged to make the exit identifier(s) (more) visible in low-light or dark conditions.

The sign does not make use of any external power source, instead relying on one or more integrated batteries within the sign. A lit sign is therefore provided even if aircraft power supplies have failed. The internally-powered emergency exit sign operates entirely independently of aircraft electricity supplies.

It will be appreciated that multiple different identifiers may be provided on a single sign, and that different identifiers on the same sign may optionally be formed in different ways.

The or each internally-powered emergency exit sign may comprise a diffuser layer. The diffuser layer may spread light from the one or more light sources, providing a more evenly-lit sign and avoiding bright spots. One or more exit identifiers may be printed onto the diffuser layer.

The or each internally-powered emergency exit sign may comprise a reflector behind the at least one electric light source. The reflector may form a layer extending across at least the majority of the area of the sign, and may be white and/or made of a mirrored, shiny, or otherwise reflective material. The reflector may increase the proportion of light directed forward, out of the sign, so increasing sign brightness for a given light source output.

The or each internally-powered emergency exit sign may comprise a light guide, which may be arranged to reduce or avoid formation of bright spots in use. A light guide may serve to spread light more evenly across the sign from one or more discrete light sources, and may be used in conjunction with a diffuser layer.

The or each internally-powered emergency exit sign may comprise a plurality of light-emitting diodes—LEDs—as the electric light source. The electric light source may comprise one or more LEDs in addition to a different light source in some embodiments.

In embodiments with multiple light sources, the light sources (e.g. LEDs) may be spaced apart by a distance of no more than 15 mm, and optionally no more than 10 mm, 9 mm, or 8 mm. It will be appreciated that an even and bright light is generally desirable—precise spacing may be determined based on LED power and diffuser quality, amongst other factors.

The LEDs (or other light sources) may be positioned along or around at least a portion of a perimeter of the internally-powered emergency exit sign, facing inwardly. Such signs may be described as being edge lit.

In embodiments with LEDs and a light guide, the light guide may extend across at least the majority of the area of the sign, and the LEDs may be arranged to direct light into the light guide. A thickness, or height, of the light guide may be selected to match LED height. The same principles may be applied for other light sources.

The at least one battery, or other energy storage device, may be arranged to hold sufficient energy to power the at least one electric light source for a period of at least 12 hours, and optionally at least 24 hours. The at least one energy storage device may be selected to hold sufficient energy to power the at least one electric light source for a period of at least a maximum duration of any flight to be taken by that aircraft, optionally including preparation time. It will be appreciated that some aircraft may only be used for relatively short-duration flights, and that e.g. battery lifespans of just 4-8 hours may be sufficient in some implementations/for some aircraft. Sign lifespan may be selected accordingly.

The or each internally-powered emergency exit sign may comprise an isolator, e.g. a battery isolator, arranged to be removed from the emergency exit sign to activate (e.g. switch on) the emergency exit sign. For example, a battery isolator may be a pull-tab arranged to cover one or more terminals of the battery/batteries until the isolator is removed—the tab's removal may complete the circuit and hence turn on the light. Similarly, an isolator may be used to insulate a terminal of a charged capacitor, so preventing current flow.

The (or each) isolator may therefore be arranged to electrically separate the at least one energy storage device from the at least one light source Removal of the isolator may be arranged to leave a visual indicator that the internally-powered emergency exit sign has been used. This visual indicator may prevent a sign from being accidentally re-used when it might not have sufficient battery power for the flight duration.

In other embodiments, an isolator may be moved whilst remaining a part of the internally-powered emergency exit sign instead of being removed from the sign.

According to a second aspect, there is provided a method of providing emergency exit lighting in an aircraft cabin. The method comprises, in response to failure of an integrated cabin electrical emergency exit sign:

obtaining an internally-powered emergency exit sign from storage, the internally-powered emergency exit sign comprising at least one electric light source, at least one energy storage device arranged to power the at least one electric light source, and an adhesive layer arranged to allow the internally-powered emergency exit sign to be adhered to a surface;

activating the internally-powered emergency exit sign; and applying the internally-powered emergency exit sign to a surface in the vicinity of the failed electrical emergency exit sign such that the adhesive layer holds the internally-powered emergency exit sign in place as a replacement emergency exit sign.

The internally-powered emergency exit sign may be as described with respect to the first aspect, and may be battery-powered. The method may be performed using the apparatus of the first aspect.

The activation step may comprise removing a battery isolator from the battery-powered emergency exit sign, or equivalently an isolator from another energy storage device such as an ultra-capacitor.

The method may further comprise checking a use-by date of the internally-powered sign before use—signs may have a limited storage life dependent on the battery type used (e.g. AA, AAA, CR2032, N, or other types of batteries e.g. as generally used in current mobile telephones), capacitor type used, or other storage device.

According to a third aspect, there is provided a method of maintaining flight-worthiness of a passenger aircraft in instances of failure of an integrated electrical emergency exit sign such that the aircraft can be flown back to a service point. The method comprises: obtaining an internally-powered emergency exit sign from storage, the internally-powered emergency exit sign comprising an adhesive layer arranged to allow the internally-powered emergency exit sign to be adhered to a surface; activating the internally-powered emergency exit sign; applying the internally-powered emergency exit sign to a surface in the vicinity of the failed electrical emergency exit sign such that the adhesive layer holds it in place as a replacement emergency exit sign; completing an intended flight of the aircraft using the internally-powered emergency exit sign as a required exit sign; and servicing the aircraft to repair or replace the failed integrated electrical emergency exit sign in advance of a next flight of the aircraft.

The method may be performed using the apparatus of the first aspect.

The internally powered emergency exit sign may be a battery-powered powered emergency exit sign.

It will be appreciated that in some embodiments of the second or third aspect, and depending on the nature and position of a battery/other power source isolator, for example, the activation step may be performed before or after applying the internally-powered emergency exit sign to a surface. The specific order of steps as listed in the methods above is therefore not intended to be limiting.

In the method of the second or third aspect, the adhesive layer of the internally-powered emergency exit sign may be applied to a surface of the failed integrated electrical emergency exit sign. The internally-powered emergency exit sign may be sized and positioned such that the integrated emergency exit sign can be partially or completely covered. The method may therefore comprise covering the integrated electrical emergency exit sign. This may assist in avoiding confusion due to multiple signs, and/or in decreasing visual clutter as compared to having a redundant sign also visible.

The method may further comprise detaching the internally-powered emergency exit sign from the failed integrated electrical emergency exit sign prior to servicing.

Embodiments of the invention therefore allow for a temporary exit sign which does not need to be connected to an aircraft power source.

Embodiments of the invention therefore allow for a temporary low-level internally-powered EXIT identifier sign, which may be placed with its upper edge less than 48 inches (122 cm) from the floor of the aircraft cabin. Embodiments of the invention also allow for temporary high-level internally-powered EXIT signs.

Embodiments of the invention therefore offer a portable emergency "EXIT" sign which can be kept aboard the aircraft (e.g. in a crew kit) and can be installed by a crew member without requiring any engineering expertise or training, in order to allow an aircraft to complete a flight.

Installing the temporary sign directly over the (failed) integrated electrical sign, such that the failed sign is covered, may provide positioning guidance to the installer as well as avoiding any confusion due to having multiple signs visible for the same exit.

The skilled person would understand that features described with respect to one aspect of the invention may be applied, mutatis mutandis, to the other aspect of the invention.

In the Figures, like reference numerals are used for like or corresponding features.

Figure 1B:
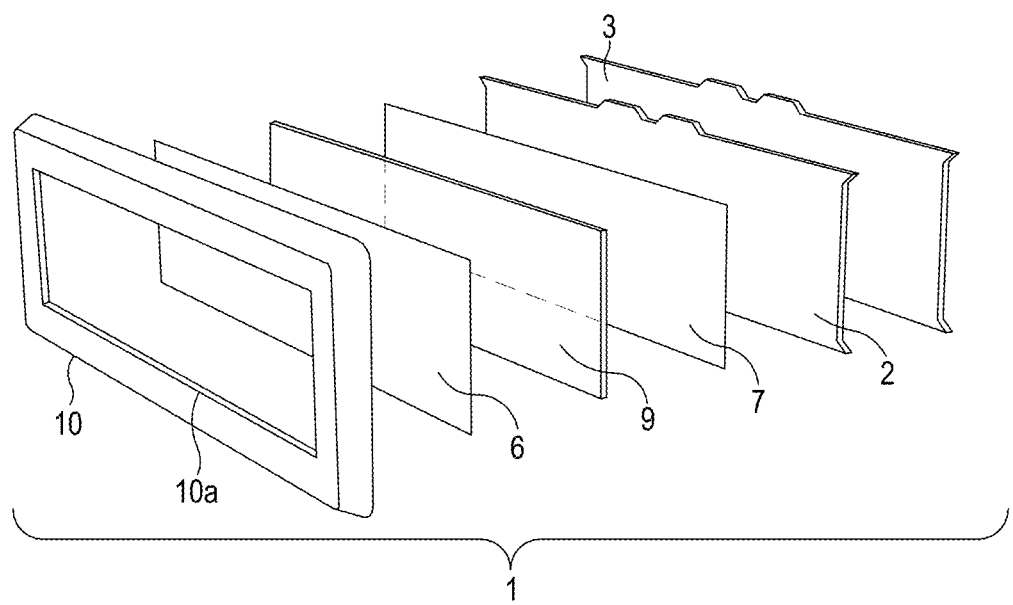
FIG. 1B is a perspective exploded view of a temporary exit sign in accordance with various embodiments of the invention.

As best illustrated in FIGS. 1A and 1B, there is provided a temporary emergency exit sign 1 for use as part of an aircraft cabin lighting system. The sign 1 is described as "temporary" as it is not a permanent fixture or fitting of the aircraft cabin lighting system, but rather is arranged to be deployed when needed, and removed (and optionally discarded) after use (generally after use for just a single flight, or part of a single flight).

The temporary emergency exit sign 1 depicted in FIG. 1 is a battery-powered emergency exit sign. It will be appreciated that alternative or additional internal power sources— e.g. ultra-capacitors—may be used in some embodiments, and that the example of a battery-powered sign described in detail herein is provided by way of example only.

The battery-powered emergency exit sign 1 is therefore arranged not to be connected to any aircraft electricity supply for cabin lighting or electrical back-up system, and may have no power inlet. The sign 1 is arranged to be entirely self-powering, having an integral power store.

The temporary emergency exit sign 1 of FIGS. 1A and 1B is substantially rectangular in shape, having a significantly narrower depth than its length or width. It will be appreciated that this rectangular shape is provided by way of example only and may vary in other embodiments—e.g. providing an oval, L-shaped, or circular sign—but that signs 1 as described herein generally have a much smaller depth than their extent in the other dimensions—i.e. they are quite thin/substantially flat. In particular, the sign 1 may have a depth of less than 3 cm or 2 cm, and preferably less than or equal to 15 mm, 1 cm, 7 mm, or 5 mm. Such signs 1 may have a depth in the range from 7 to 25 mm, and optionally from 10 mm to 20 mm.

The temporary emergency exit sign 1 of FIGS. 1A and 1B comprises a plurality of layers. The sign 1 comprises a base layer 2. The base layer 2 extends across at least a majority of the surface area of the sign 1 and provides a substrate on which other components can be mounted.

In particular, one or more electric light sources 4 and one or more batteries 5 are mounted on the base layer 2 (directly or indirectly) in the example shown.

The base layer 2 is made of plastic in the example being described, but may be made of one or more different materials in other embodiments.

The batteries 5 are directly mounted onto the base layer 2 in the example shown, for example being glued to it, or being clipped into formations of the base layer 2. In other examples, the one or more batteries 5 may be mounted to the base layer indirectly, e.g. via one or more intermediate layers or connectors, such as a battery holder which may be adhered to the base layer 2. The base layer 2 may protect the batteries 5, and may be electrically insulating and/or waterproof (or at least water-resistant).

Two batteries 5, mounted near opposing ends of the sign 1, are shown in the example pictured in FIG. 1A. It will be appreciated that different numbers and arrangements of batteries 5 may be selected in other examples. In selecting batteries, button cells (also referred to as coin cells) may be favored as these cells are relatively flat and narrow, so fitting within a thin sign 1. Cylindrical, or differently-shaped, cells may be used in other examples. The battery/cell size may determine the sign thickness.

For example, in various embodiments battery types selected may be AA (approx. 14 mm diameter (smallest dimension), cylindrical cell), AAA (approx. 10.5 mm diameter (smallest dimension), cylindrical cell), CR2032 (3.2 mm height (smallest dimension), button cell).

The at least one battery 5 in the sign 1 may be arranged to store sufficient energy to power the at least one electric light source 4 (with a brightness sufficient to at least meet, and preferably exceed, minima laid out in relevant standards or other requirements) for a period of at least 6, 8, 10 or 12 hours, and optionally at least 24 hours. The period may be selected based on a maximum flight duration, optionally adding an allowance for aircraft preparation and boarding time. After that period, the emitted light may fade as the battery 5 runs out of charge, and the light may go out completely. In various implementations, a maximum life for a given sign 1, having particular light source(s) (e.g. LEDs) and power source(s) (e.g. batteries) may be determined (e.g. 8 hours, 12 hours, 24 hours, 36 hours) and a limitation may be placed on the usage of that sign 1 accordingly. For example, printed text on the back of the sign 1 may state that it is to be used only for flights with a maximum flight duration of X hours, where X may be one or two hours less than the determined lifespan of the sign. It will be appreciated that the sign 1 for use on a given flight must generally be selected to have a lifespan (e.g. battery life) of at least the flight duration, preferably with an allowance for unexpected delays and/or passenger boarding and disembarking.

Signs 1 will therefore have a limited usage time, the usage dependent on the battery type and number of batteries 5 used, and the power demand of the light source(s) 4 to provide at least a minimum light output level.

The temporary signs 1 may be configured to run on 3-6 V DC power, this power being provided by one or more integrated batteries 5.

Regulations (e.g. CS25.812(i)) state that the energy supply to each emergency lighting unit must provide the required level of illumination for at least 10 minutes at the critical ambient conditions after emergency landing. As the temporary signs 1 as described herein are not powered by the aircraft back-up battery system or main electrics, the signs 1 therefore need to provide the required light output for their whole period of use—i.e. the whole journey and pre flight preparation, e.g. cleaning and boarding, where the fault in the permanent emergency light is noted on the ground, or the full remainder of the expected flight time, with a safety margin, should the fault be discovered in-flight. Number and type of batteries 5 may be selected accordingly.

Temporary signs 1 as described herein are therefore also likely to have a maximum storage lifespan set based on the battery type—batteries may degrade over time, so old and unused signs 1 may need to be disposed of, or have their batteries replaced. A use-by date may be marked on the base 2 or frame 10 of a sign 1. In many embodiments, the batteries 5 are not removable or replaceable so as to minimize the risk of tampering or accidental damage. It will be appreciated that similar considerations my apply for other energy sources 5.

The electric light sources 4 are light-emitting diodes (LEDs) in the example being described, and are arranged along two opposing edges of the sign 1, facing each other and directed towards each other. The LEDs 4 are positioned around a perimeter (and more specifically, along the two longer edges of the perimeter) of the battery-powered emergency exit sign 1, facing inwardly. In other embodiments, the LEDs (or other light sources 4) may be positioned evenly around the full perimeter—on both the long and short edges for a rectangular sign 1, or only on one edge of the sign.

In various embodiments, the light sources 4 may be arranged along one, two, three, or all four, edges of the sign 1, for example being located along inside walls of the frame 10. A continuous LED strip 4 extending all around the perimeter of the sign 1, e.g. along an inner wall of the frame 10 in implementations with a frame 10 as described below, may be used in some embodiments.

Such signs 1, with inwardly-directed light sources 4 arranged along at least a portion of, or all around, the perimeter of the sign may be described as edge-lit.

In some implementations, Chip-On-Board (COB) LEDs may be used as the light source 4. COB LEDs have high efficiencies, so may be able to provide a required level of light output/brightness for a longer period of time than other current LED designs, for the same stored battery power. COB LEDs are generally provided as strips of very closely-spaced, small, LEDs; these strips may be arranged along at least a portion of the perimeter of the sign 1, facing inward, to provide edge lighting of the sign 1. One or more diffusers and/or light guides 6, 7, as described below, may be provided to assist in spreading the light evenly across the sign 1, or to direct the light to specific regions of the sign 1.

Different electric light sources 4 may be used in other embodiments, and/or the electric light sources 4 may be differently arranged—for example there may be a tape/row of LEDs extending around the full sign perimeter, only one edge of the sign may have LEDs, or the LEDs may be spaced across the areas of the sign 1.

In embodiments in which the light sources 4 are spaced across the areas of the sign 1, the light sources may be forwardly-directed (upwardly directed, in the orientation shown in FIG. 1A—i.e. away from the base 2) instead of facing across the sign 1. Such signs 1 may be described as being back-lit rather than edge-lit.

The LEDs 4 may be white LEDs. Alternatively, colored LEDs or a mix of LED types may be used. Currently, standard CS25 states that emergency exit lights must have white backgrounds, but other colors may be approved for use in future, and/or used on aircraft to which that standard does not apply.

The LEDs 4 of various embodiments are reasonably closely spaced, for example being spaced apart by a distance of no more than 15 mm, and optionally no more than 10 mm, 9 mm, or 8 mm, so as to provide a reasonably even and bright glow across the sign 1. For example, there may be a minimum of 120 LEDs 4 per meter of an LED strip. A sign 1 with a single strip of LEDs 4 may therefore have 120 LEDs per meter of sign length, whereas a sign with two parallel strips of LEDs may have 240 LEDs per meter of sign length. It will be appreciated that LED spacing may be adjusted as appropriate based on factors including LED brightness, diffuser quality, and sign width amongst others.

The electric light sources 4 are mounted onto the batteries 5, and thereby onto the base 2, in the embodiment shown in FIGS. 1A and 1B. The electric light sources 4 may be differently-mounted in other embodiments, for example being mounted to the base layer 2 directly, or to a frame 10 as described below. Wiring or other circuitry (not shown in the figures for clarity) may be provided to connect the light source(s) 4 to the one or more batteries 5. This circuitry may be fully enclosed within, and protected by, the layers of the sign 1.

The temporary emergency exit sign 1 of FIGS. 1A and 1B comprises a frame 10 arranged to be connected to the base layer 2; e.g. clipping onto the base layer or being adhered thereto. The frame 10 may serve to hold the layers together and protect the batteries 5 and electric light source(s) 4 therewithin. The electric light sources 4 may be mounted onto the frame 10 in some embodiments.

The frame 10 and base 2 may together form a housing 2, 10 for the sign 1. The frame 10 and base 2 may both be made of plastic, and preferably from a plastic with a fire-resistance rating suitable to meet aircraft safety standards. Suitable materials may include Polycarbonate, Acrylonitrile Butadiene Styrene (ABS), polyethylene terephthalate glycol (PET-G), Aluminum, Resin, Poly(methyl methacrylate) (PMMA), Acrylonitrile styrene acrylate (ASA), Polyether ether ketone (PEEK), Polyetherketoneketone (PEKK), Nylon, Alumide, or another suitable polymer. Metal may be used instead of, or as well as, plastic in some embodiments.

The housing 2, 10 may also be water-proof or water-resistant, so protecting the batteries 5 and circuitry.

The frame 10 is open-fronted in the embodiment being described, having a rim 10a arranged to extend inwardly from the sign's perimeter, overlapping the underlying layer(s) and so holding them in place. The frame 10 may instead comprise a sheet covering the front of the sign 1 in some embodiments, In the embodiment shown in FIGS. 1A and 1B, a marker layer 6 is provided above the base layer 2, and above the electric light source(s) 4. In the embodiment shown, this marker layer 6 is the top-most layer over most of the area of the sign 1, located adjacent to and below the rim 10a of the frame 10. An intervening protective layer may be provided between the marker layer 6 and the frame 10, and/or the frame 10 may comprise an at least partially transparent front layer covering the surface are of the sign 1, in other embodiments.

In still other embodiments, the marker layer 6 may be a part of the frame 10. The marker layer 6 may be integral with, or connected to, the frame 10. The marker layer 6 may form part of the housing 2, 6, 10 in such embodiments.

Figure 7:
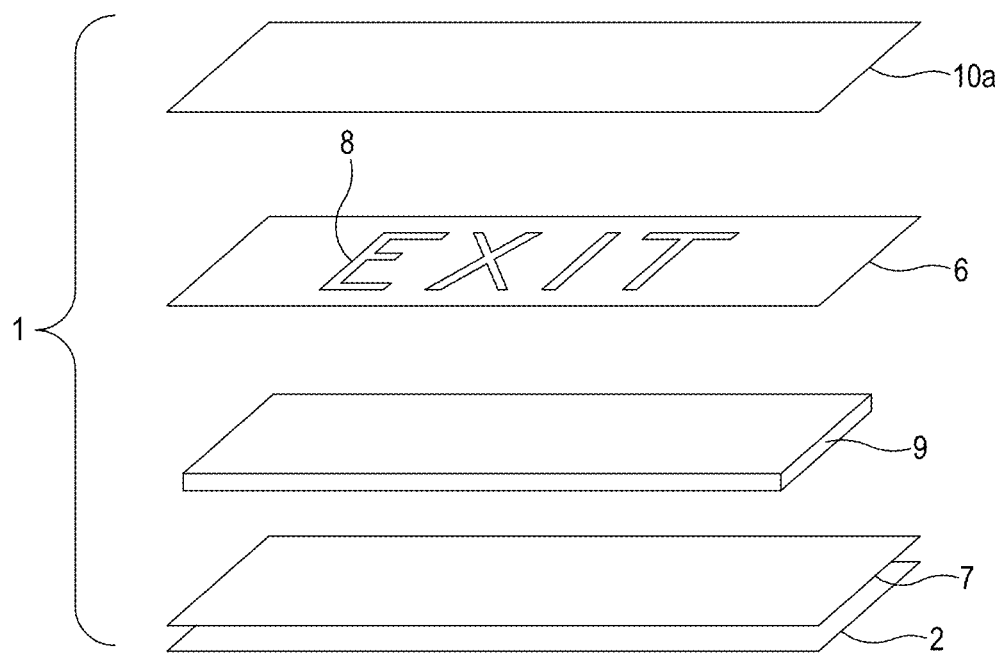
FIG. 7 is a perspective exploded view of a temporary exit sign in accordance with other embodiments of the invention.

The marker layer 6 is arranged to provide one or more markings. The marker layer 6 has informational text or symbology 8, as shown in FIG. 7, such as text reading "EXIT" and/or a running person image, and/or one or more arrows—this may be referred to as an exit identifier. The marker layer 6 may be colored—for example, green or red colors are common for emergency signs, often with white for contrast. For example, standard CS25.812(b)(1)(i) requires that each passenger emergency exit locator sign required by CS 25.811(d)(1) and each passenger emergency exit marking sign required by CS 25.811(d)(2) must have red letters on an illuminated white background or a universal symbol, of adequate size. These signs must be internally electrically illuminated with the brighter area having a brightness of at least 86 candela/m$^2$ (25 foot lamberts) and a high-to-low contrast within the white background of a letter-based sign or green area of a universal symbol no greater than 3:1. These signs must also have a contrast between the brightest and darkest elements of at least 10:1. Opacity and color of one or more regions of the marker layer 6, light source color, and number and type of light sources 4 and batteries 5, and diffuser quality, may therefore be selected accordingly to meet these standards (at least for aircraft for which these standards are applicable).

The marker layer 6 may comprise opaque portions and translucent or transparent portions, or may be translucent or transparent across its full surface area.

The marker layer 6 may form a protective front face of the sign 1. In such embodiments, any printed symbology 8 on the marker layer 6 may be printed on the inner side/underside of the marker layer 6, such that the symbology 8 is not exposed—risk of scuffing or damage to the symbology 8 may therefore be reduced.

In various embodiments, the marker layer 6 is arranged to provide variations in transparency across the surface area of the sign 1, such that light from the light sources 4 is visible in some regions but not others. In some embodiments, the marker layer 6 may be fully opaque and may be provided in one or more discrete regions as opposed to as a single continuous layer with varying transparency across the sign 1, such that light is only visible in regions of the sign 1 not covered by the marker layer 6. The marker layer 6 may vary in color across its area, and/or may have a different color from whatever is visible behind the marker layer 6, such that the exit identifier is visible in normal lighting conditions without relying on the light source(s) 4.

The text or other symbology 8 of the marker layer 6 may be provided in positive or negative form. For example, the marker layer 6 may comprise opaque (optionally red or green) lettering 8 on a transparent or translucent, colorless or white, background, such that dark letters show up on a light background when illuminated in dark conditions (negative form of the symbols 8), or the marker layer 6 may comprise transparent or translucent lettering 8 on an opaque (optionally red or green) mask background (positive form of the symbols 8).

The symbols 8 and background may both be translucent or transparent but with differing colors and/or transparencies, in some embodiments.

It will be appreciated that the marker layer 6 may be differently shaped from the base layer 2, and may not extend across the whole base layer. For example, the marker layer 6 may be provided by, and indeed may consist of, ink printed onto another layer in the shape of one or more exit identifiers (e.g. onto a sheet of a frame 10—e.g. on the inside of the frame sheet to protect the markings, in embodiments in which the frame 10 extends across the surface areas of the sign 2, or onto a diffuser layer as described below). The ink, which may be UV-cured, is adhered to another layer in such embodiments. The ink constitutes the marker layer 6 in these embodiments. The ink may be selected to coat the layer onto which it is printed as opposed to soaking into it, thereby providing a distinct layer covering a portion of the sign's surface area, and increasing the minimum thickness of the sign 1. The marker layer 6 may comprise multiple discrete parts—e.g. separate, unjoined, shaped regions each forming a single letter of an exit identifier.

In some embodiments, a protective layer 10a (e.g. as part of the frame 10, or a separate sheet as shown in FIG. 7) is provided above the marker layer 6, on a side of the marker layer 6 remote from the base layer 2. The protective layer 10a is at least semi-transparent to wavelengths emitted by the light source(s) 4. The protective layer 10a may shield the marker layer 6, light source(s) 4, batteries 5, and other components, from damage, and may be waterproof. The protective layer 10a may be a thin transparent film. An adhesive layer may be provided to adhere the protective layer 10a to the marker layer 6. The adhesive may be provided as part of the protective layer 10a, as part of the marker layer 6, or separately. In some embodiments, the adhesive may be provided in one or more discrete regions as opposed to as a uniform layer across the sign 1, or a different method of affixing a protective layer may be used. In alternative embodiments, no protective layer may be provided.

It is desirable that the protective layer 10a and any adhesive layer are both transparent, or at least partially transparent, to wavelengths emitted by the light source(s) 4.

In some embodiments, the temporary emergency exit sign 1 comprises a diffuser layer 6, and the exit identifier 8 is printed onto the diffuser layer. The diffuser layer 6 may therefore be thought of as the marker layer 6, and may provide light diffusion as well as the exit identifier 8—this diffusion may provide a more even glow from discrete light sources 4, spreading the light more evenly across the surface area of the sign 1. The diffuser layer 6 may have a thickness in the range from 100 microns to 500 microns, and optionally may have a thickness of 250 microns. A matt or diffuse polycarbonate material may be used for the diffuser layer 6.

In alternative embodiments, there may be no separate marker layer 6. Instead, the light source(s) themselves may be shaped or arranged to provide one or more indicia (e.g. text, symbols, or images) to provide an exit identifier. For example, the image or text may be provided by the distribution of LEDs 4 across the base layer 2. The base layer 2 (or another layer behind the light sources 4) may also be colored accordingly, optionally to allow the same indicia to be visible when the sign 1 is well-lit to the extent that the electric light from the sign 1 is not notably visible.

In embodiments in which the sign 1 is provided with a protective layer 10a across its front face, the protective layer 10a is desirably arranged to cover substantially the entirety of the indicia and any border thereto, and to protect the sign 1 from wear and tear. The protective layer 10a may have a finish selected from matt, gloss, or anti-glare.

The underside of the base layer 2 may be described as forming a rear face of the sign 1, with the informational text or symbology 8 being visible from the front. On an underside of the sign 1, and more specifically on the underside of the base layer 2, there is provided an adhesive layer 3. The adhesive layer 3, may be, for example, in the form of an adhesive spread onto the base layer 2, or a separate layer applied thereto. The adhesive layer 3 may be applied to, or formed as part of, the base layer 2, or there may be one or more intervening layers. The adhesive layer(s) 3, 14 may comprise any suitable adhesive known in the art. Different adhesives may be used for different adhesive layers 3, 14 of the same sign 1.

The separation of layers 2, 3 depicted in FIG. 1, and the lack of intervening layers, are shown by way of example only, and not intended to be limiting.

In various embodiments, the adhesive layer 3 may be or comprise:

(i) an even layer of an adhesive material spread across the underside of the sign 1; or
(ii) one or more separate adhesive areas, or patches, on the underside of the sign 1.

The adhesive layer 3 is therefore optionally a continuous layer extending across the full area of the sign 1, but may comprise a plurality of discontinuous adhesive areas, or a single adhesive area smaller than the sign 1, in other embodiments.

A peel-off cover layer (not pictured) on the underside of the sign 1 may also be provided in some embodiments, to protect the adhesive layer 3 prior to use/to prevent the sign 1 from sticking to something unintentionally. Similarly, the peel-off cover layer may be a single piece, optionally extending across the full area of the sign 1, or may comprise multiple sections, or a shaped single piece, covering some or all of the area of the sign 1. The cover layer may generally be arranged to cover all of the adhesive, howsoever the adhesive is arranged, and may be made of paper (optionally coated paper).

The temporary sign 1 is arranged to be stuck or adhered to an object or surface by means of the adhesive layer 3. The temporary sign 1 may therefore be described as a decal.

In some embodiments, the adhesive layer 3 is arranged to be detachable from the surface to which it is applied, such that the temporary emergency exit sign 1 can be temporarily installed and then removed later without damaging the sign 1 or the surface, e.g. by peeling off the sign 1. The adhesive layer 3 may be arranged to peel off, and the sign 1 may be re-used (following recharging, if necessary). However, in some cases, there may be a desire to avoid peel-off signs in case of passenger tampering—a more permanent adhesive material may be used in such cases. A solvent may be used to remove the temporary sign 1 once it is no longer needed in such cases, or the temporary sign 1 may be peeled, scraped, or ripped off a surface and a solvent used to remove any remaining adhesive on the surface. If the temporary sign 1 is not damaged, a new adhesive layer may be applied to allow it to be reused in such embodiments. Alternatively or additionally, a fitting 26 to which it is adhered may simply be replaced in some scenarios.

The marker layer 6 of the embodiment shown in FIGS. 1A and 1B is a film extending across substantially all of the surface area of the sign 1. As an alternative, the marker layer 6 may be printed directly onto an underlying layer (the base layer 2, or another layer as described below), or onto an underside of the top/protective layer 10. The marker layer 6 may be printed using a UV-curable ink. The marker layer 6 may be, for example, formed from a solvent-based digital print or screen-print. The marker layer 6 is desirably at least partially opaque to at least some wavelengths emitted by the electric light source(s) 4 in some regions, so as to provide variation in appearance across the surface area of the sign 1. In some embodiments, the marker layer 6 is substantially opaque in parts. In some embodiments the marker layer 6 may comprise a colored film such as a green or red film. A transparent, or translucent, colored film may be used to filter light emitted from the light source(s) 4, so adjusting the visible color(s). In some embodiments the marker layer may comprise a film, clear or colored, on which an opaque ink has been printed. In some embodiments the symbology or words 8 can be printed onto a dedicated marker layer film, or in other embodiments may be printed directly onto a different layer.

Symbology or words 8 may be or comprise wording such as "EXIT" or arrows to indicate direction or other symbols such as an image of a running person. Where the symbology or words 8 are provided in opaque positive form in the marker layer 6 (and so in negative form for the light) the desired words or symbology may be printed on the marker layer 6. The printed portion 8 of the marker layer is selected to at least partially block the transmission of emitted light from the sign 1—for example, the printed portion 8 may: (i) block all light, so forming a dark area; (ii) block some light evenly across the visible spectrum, so providing a darker area that is still not fully dark, still providing enough contrast to make the markings visible; or (iii) block some frequencies of light, such that the printed portion 8 acts as a filter and changes the color of the illumination, e.g. to red or green from white light.

The printed portion 8 of the marker 6 of one embodiment may fully block light transmission. In the final product of such an embodiment, the symbology or wording 8 may appear as a dark area on an illuminated background in the sign in a low light level scenario.

In some embodiments the marker layer may comprise a green, black, or red print on a film. It will be appreciated that red, black, or green text for "EXIT" is commonly used so likely to be familiar to passengers, and green print is common for running person images for exits. The print may be the wording or symbology 8. The print may be a layer with the words or symbology 8 in negative (such that the exit identifier is visible in positive form when illuminated). The print color/other marker layer color may therefore be selected to provide a familiar visual sign when the temporary sign 1 is well-lit such that the visibility of its own electric light is negligible (e.g. the emitted light may not be noticeable under normal lighting conditions/may be overpowered by daylight or standard electric cabin lighting in normal conditions), and to shape the visible emitted light when the sign 1 is less well-lit. The word(s)/symbol(s) may therefore be visible during both well-lit and dark ambient conditions when sign 1 is in use, even when ambient light overpowers the internal illumination.

Where the symbology or words 8 are provided in negative form in the marker layer 6, the symbology or wording 8 will appear as an illuminated area on a dark(er), or differently-colored, background in the emergency sign 1 in a low light level scenario. In some embodiments a print may be made of an opaque material over a surface area of the marker layer 6 with unprinted areas on the layer forming the words of symbology. In other arrangements the words or symbology 8 could be formed by one or more cut outs in an opaque film. The words or symbology 8 may be provided by an aperture in the film 6 or in another embodiment by a portion of the layer where there is no printing on the marker layer 6.

The marker layer 6 may therefore provide information arranged to be visible in well-lit conditions—e.g. standard, printed black and white or color information, arranged to be visible without the need for internal lighting, simply in cabin lighting if/when the cabin is well-lit. Nonetheless, the sign 1 is activated before a flight, as described below, to ensure that the internal lighting is switched on in case of unexpected darkness (due to e.g. a failure of cabin lighting).

In embodiments with a marker layer 6, it is desirable that the marker layer 6 is transparent or at least partially transparent, to wavelengths emitted by the electric light source 4 in any regions in which the light is intended to show through.

Importantly, provided that the batteries 5 are charged, in a low ambient light scenario light emitted from the light source(s) 4 passes through at least a portion of any marker layer 6 and/or protective layer 10 and the emergency signage or symbols 8 is visible to the passengers and crew of the aircraft. Typically, a low light scenario is one in which normal electric lighting in the aircraft has failed and the cabin is dark. It will be appreciated that the light emitted can be in the range to which the human eye is sensitive in scotopic vision. A level or intensity of light output from the sign 1 may then be lower than would be needed if the light output is in a different range of wavelengths, so getting a maximum duration of useful sign life from relatively small and low-power batteries 5. Color/wavelength of the emitted light may be selected as appropriate.

In a normal lighting scenario, the ambient light is reflected from the sign 1, which may show similar (or identical) information to that shown by the sign's internal lights 4 in lower lighting conditions (e.g. due to printing on, or as part of, a marker layer 6, or to coloring of the base layer 2 itself or an intervening layer). Emissions from the internal light source(s) 4 may be relatively much lower than the reflected light and may not be perceived by passengers or crew under normal lighting conditions. Consequently, the sign 1 may provide information (which may or may not be the same) under two different lighting conditions. It will be appreciated that, for emergency exit signs, it may generally be the same information that is arranged to be shown in both lighting scenarios. However, in some cases there may be differences, such as additional information being visible in normal lighting. For example, the printed information on the marker layer 6 visible in normal lighting conditions may mark an exit 28 as an emergency exit and also provide text instructions for passengers sat in the emergency exit row (e.g. regarding positioning of bags). By contrast, the illumination may be arranged to show less and/or simpler information—for example simply reading "EXIT", optionally with an accompanying arrow. In other examples, the information provided may be equivalent under both lighting scenarios.

The temporary emergency exit sign 1 of various embodiments therefore comprises an exit identifier 8 arranged to be lit (e.g. made visible, or made more visible) in low-light conditions by one or more internal electric light sources 4 of the sign 1. It will be appreciated that, depending on light levels and print contrast, the exit identifier 8 may be visible in low-light conditions even without the sign's internal electric lighting 4, but the glow may improve its visibility. The glow may therefore augment its visibility.

The exit identifier 8 of some embodiments may comprise one or more words and/or symbols which are formed by arrangement of the electric light sources 4, either in a positive fashion (such that the exit identifier—e.g. the word "EXIT" or a running figure—glows) or in negative fashion (such that the exit identifier—e.g. the word "EXIT" or a running figure—shows up as dark lettering on a glowing background). The distribution of the electric light sources 4 across the base layer 2 may therefore be arranged such that the indicia, or a mask for the indicia, are formed by the positioning of the electric light sources 4. A marker layer may therefore not be present in all embodiments.

Alternatively or additionally, the exit identifier 8 may comprise one or more words and/or symbols which are formed by masking of an even glow across the sign's area provided by the light source(s) 4. The mask may form the indicia, such that the exit identifier—e.g. the word "EXIT"—shows up as dark lettering on a glowing background, the exit identifier being formed by a mask over the light source(s) 4, or the mask may provide a negative of the indicia such that the indicia glow. The mask may be described as a marker layer 6. In such examples, the distribution of the light sources 4 may be even across the base layer 2, or the sign 1 may be edge-lit, with light sources 4 arranged along one or more edges of the sign 1 and facing across the sign 1.

Dark areas may therefore be formed by masking of parts of an optionally uniform illuminated area. Illuminated areas may therefore be formed by not covering selected regions of an optionally uniformly lit area, or by shaping/positioning light sources 4 appropriately across the base layer.

The exit identifier 8 may therefore be shown in positive or negative form, but in either case is electrically lit by means of internal battery power 5.

It will be appreciated that, irrespective of specific choices of batteries 5 (or other power sources) and electric light sources 4, the sign 1 must meet aerospace requirements. These include DO-160 for environmental requirements such as the effects of temperature, altitude, humidity, shock and crash safety, vibration, water and fluid susceptibility, flammability etc. Signs must meet the requirements of CS/FAR25.853 with regard to flammability resistance. The light level provided by the sign 1 must also meet the requirements of CS/FAR 25.812 for large airplanes or CS 29.812 for large rotorcraft for safety critical signage, particularly where the signs are used for emergency exit signs. In small aircraft or rotorcraft the sign may need to meet the requirements of CS23.2315, CS27.805 and/or CS27.807.

The temporary emergency exit sign 1 of various embodiments is flexible, such that it can adapt to the shape of a surface to which it is applied, at least to some extent. It will be appreciated that one or more batteries 5 and/or light sources 4 may be rigid, so the sign 1 may not be fully flexible—for example, it may bend between the batteries 5. The sign 1 may therefore stick to a curved cabin wall 24, or to a flat wall portion or fitting 26, and may bend around corners of the surface to which it is applied. The sign 1 may be smoothed into place by hand.

In alternative implementations, the sign 1 may be at least substantially rigid—for example, the base 2 and frame 10 may be rigid. The sign 1 may be flat, or may have a curve designed to match an aircraft cabin wall curve, for example.

The temporary emergency exit sign 1 of various embodiments is sized and shaped to at least partially cover an electrical emergency exit sign 26 when the adhesive layer 3 is applied to the permanent electrical emergency exit sign 26. It will be appreciated that electrical emergency exit signs 26 forming part of the wired lighting system of different aircraft 22 may have different dimensions, and that even within the same aircraft cabin 20, differently-dimensioned signs may be present, for example positioned by different emergency exits 28, or at different locations 26a, 26b within the cabin. The dimensions may therefore be selected as appropriate for the emergency exit sign 26 the temporary sign 1 is intended to replace.

The temporary emergency exit sign 1 may have a surface area (in particular, of a front face of the sign on which indicia are visible) of between 9 cm² and 400 cm², and optionally between 25 cm² and 400 cm², and optionally between 25 cm² and 50 cm². The sign 1 may have an area of around 40 cm² or around 90 cm² in some embodiments.

Turning to the standard, FAR 25.812 states "Each passenger emergency exit locator sign . . . and each passenger emergency exit marking sign must have red letters at least 1½ inches high on an illuminated white background, and must have an area of at least 21 square inches excluding the letters", and CS25.812 states that each passenger emergency exit locator sign must have red letters on an illuminated white background or a universal symbol, of adequate size. These standards apply to the high level signs 1b, 1c above the door 28 and in the ceiling of an aircraft cabin.

Typical sizes for high-level signs may be around 330 mm×52 mm (surface area). Smaller signs can be used provided that it can be demonstrated that they can be seen from the viewing distance required.

Low level signs 1a (e.g. next to the doors 28) are generally much smaller than high-level signs as they only need to be seen from the aisle. For example, these may have surface area dimensions as small as 55 mm×35 mm.

The sign 1 may be square or rectangular in shape, for example having dimensions of 3 cm by 3 cm, or 10 cm by 4 cm.

The sign 1 may be much thinner in the third dimension, such that the sign is substantially flat. In some embodiments, the sign 1 may have a thickness is the range from 3 mm to 25 mm, and optionally from 5 mm to 20 mm, and optionally around 10-15 mm. The batteries 5 and light sources (e.g. LEDs) 4 may make up the majority of the sign's thickness.

A protective layer 10, if present (either independently or as an integral part of a housing), may add around 0.5 mm to sign thickness as compared to the same sign without a protective layer.

Figure 3:
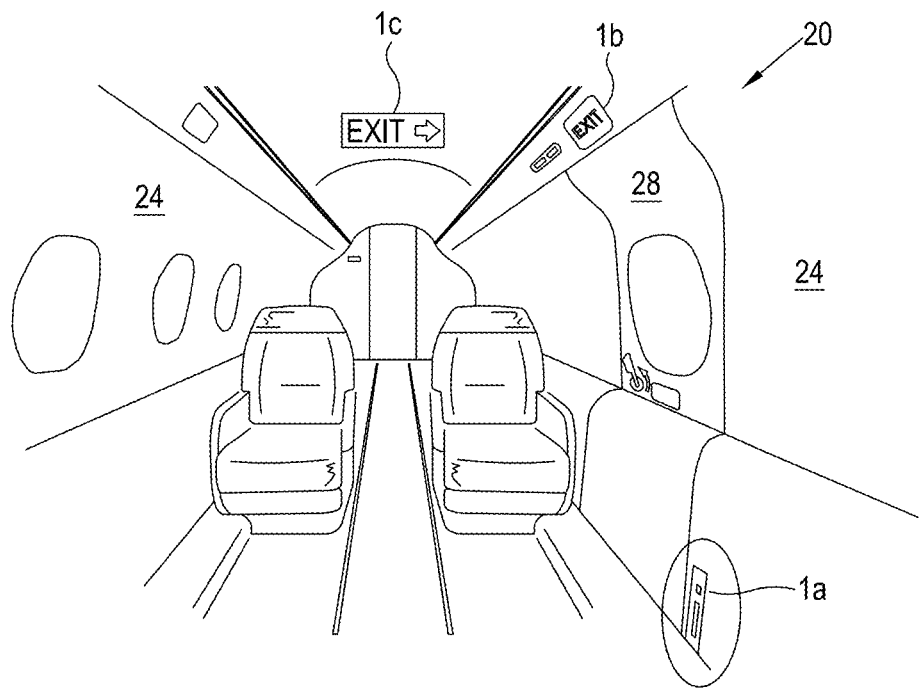
FIG. 3 is a view of a cabin of an aircraft, including an aircraft cabin lighting system of an embodiment.
Figure 4:
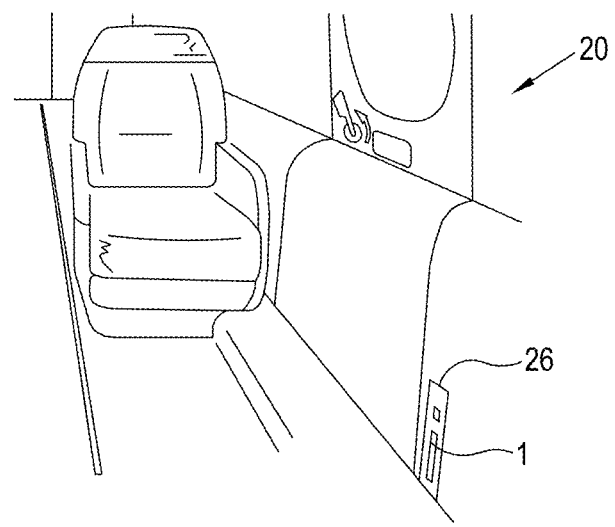
FIG. 4 is a view of an aircraft cabin fitting with an internally-powered sign mounted thereon, within an aircraft cabin.

As illustrated in FIGS. 3 and 4, it is intended that the temporary sign(s) 1 will be utilized in a cabin 20 in an aircraft 22. FIG. 3 illustrates one low-level sign 1a and two high-level signs 1b, 1c, all of which are examples of signs 1. A first high level sign 1b is shown mounted on a wall of the aircraft cabin, above a door 28. A second high level sign 1c is shown mounted on a ceiling of the aircraft cabin, above the aisle and directing a viewer to the door 28. More specifically, a sign 1 as described herein may be mounted to an aircraft cabin ceiling by adhering it to an extant light-fitting or other sign which extends downwardly from the ceiling.

The sign 1 may be adapted to be secured to a wall 24 in the cabin 20 or to be secured to a fixture or fitting in the cabin 20 of the aircraft 22, such as being adhered to a permanent emergency exit sign 26 as shown in FIG. 4. In some embodiments, the sign 1 may be adapted to be secured to an emergency exit door 28 in the cabin 20 of the aircraft 22

It will be appreciated that the temporary sign 1 is used to be indicative of the location of an emergency exit 28. Generally, low-level signs may indicate the immediate presence of an emergency exit, and high-level signs may direct a viewer to one or more emergency exits (e.g. being located spaced from an emergency exit and providing an arrow towards such an exit) and/or indicate the immediate presence of an emergency exit (e.g. being directly above an emergency exit door).

Figure 5:
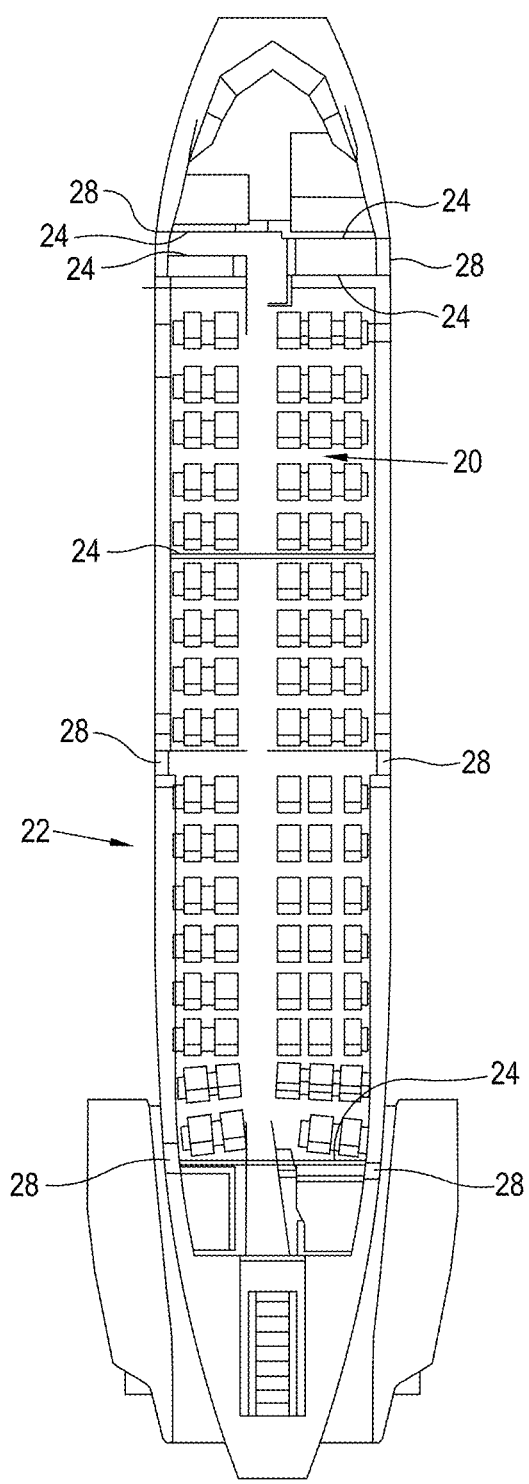
FIG. 5 is a view of an aircraft in which embodiments of the invention may be implemented.

FIG. 5 is a schematic indication of an aircraft in accordance with the invention in which the location of emergency exits 28 are indicated by location of signs on the walls 24 and ceiling of the cabin 20.

An aircraft cabin lighting system comprises one or more cabin lighting units 26, each cabin lighting unit 26 comprising an emergency exit sign which is arranged to be electrically illuminated via permanent wiring of the cabin. These signs are fittings 26 of the aircraft cabin 20, and not intended to be removed between services. If one or more bulbs in one of these electrical emergency exit signs 26 fails, or if another fault causes the electrical sign 26 to fail, the aircraft 22 may be grounded (or not allowed to fly with any passengers, or only with a reduced number of passengers) until that fault is fixed, due to stringent safety standards.

In aircraft cabin lighting systems of the invention being described herein, one or more temporary signs 1 as described above are provided. Desirably, these are stored in a location known to cabin crew, but not accessible by passengers.

In case of a failure of a standard emergency exit sign 26, a temporary sign 1 can be retrieved, activated/turned on, and then positioned and mounted suitably so as to mark the exit 28 for which the electrical sign 26 has failed. The temporary sign 1 may be adhered to a cabin wall 24 adjacent to the failed sign 26, or may be adhered to the failed sign 26 itself, optionally completely covering the failed fitting 26. The temporary sign 1 may be adhered to the exit door itself 28 in some scenarios, although this may no longer be visible inside the cabin once the door is opened, so may not be desirable.

Activating, or turning on, the temporary sign 1 may comprise removing a pull-tab or other battery isolator arranged to separate the or each battery 5 from circuitry connecting it to one or more light sources 4. For example, the battery isolator may cover one or more terminals of the or each battery 5, or otherwise break an internal circuit of the sign 1.

Removal of the battery isolator may be arranged to leave a mark on the sign 1 such that it is shown to be used. For example, the battery isolator may comprise a first film adhered to a second film or layer, with the second film or layer (which remains as part of the sign) comprising wording such as "USED—NOT FOR RE-USE", which wording is disguised or hidden by the first film until its removal. This may be of particular utility for signs 1 intended to be single-use, although a battery isolator may be replaced after recharging of the one or more batteries 5 in some embodiments. The sign 1 may therefore be arranged such that removal of the battery isolator leaves a visual indicator that the battery-powered emergency exit sign 1 has been used.

It will be appreciated that battery capacity generally degrades slowly with charge-discharge cycles, so a maximum number of re-uses for a sign 1 may be specified even for signs 1 with rechargeable batteries. The maximum recommended/approved number of uses may be one in some implementations even if the batteries 5 are rechargeable, to guarantee performance. For signs 1 with non-rechargeable batteries 5, the batteries 5 may be replaceable or the sign 1 may be explicitly single-use.

In other implementations, a switch may be provided in place of a removable battery isolator, and/or a plurality of battery isolators/switches may be provided.

Safety requirements for providing guidance to passengers and crew are therefore met by providing the temporary sign 1 in an emergency scenario, such that the aircraft 22 is able to continue with its intended flight. Additionally the aesthetic appearance of a cabin is not reduced by the intrusion of additional emergency signage in normal use if the temporary sign 1 covers the failed fitting 26, whilst still allowing safety requirements to be met.

In various embodiments, including those shown on FIGS. 1 and 7, the sign 1 comprises a light guide layer 9. The light guide layer 9 may have a thickness of around 2-5 mm, and optionally of around 3 mm.

In the embodiment shown in FIGS. 1A and 1B, the sign 1 is edge-lit, and the inwardly-directed LEDs 4 face the edges of the light guide 9. The LEDs 4 may therefore surround the light guide 9. The light guide's thickness is selected to match the LEDs' thickness, to capture a high proportion of the emitted light. The light guide 9 serves to diffuse the light evenly, reducing or avoiding the risk of bright spots. Typically, the light guide 9 may be made of acrylic (e.g. PMMA), which has a very high light transmission. The material may also be selected not to yellow with age, although it will be appreciated that this may be of limited relevance to a temporary sign 1 with only a relatively short intended usage duration. The light guide 9 extends across at least the majority of the surface area of the sign 1.

In embodiments with forward-facing light sources 4, the light guide 9 may instead lie in front of the light source(s) 4, and between the light source(s) 4 and a front of the sign 1.

In embodiments in which the marker layer 6 comprises a diffuser layer (e.g. with printed artwork thereon to provide symbols 8), a light guide 9 may be used in addition such that the marker/diffuser layer 6 is not solely responsible for spreading the light evenly. In other embodiments, only a single diffuser/light guide layer 6, 9 may be provided, or no diffuser/light guide may be provided.

In various embodiments, including those shown on FIGS. 1 and 7, the sign 1 comprises a reflector 7. The reflector, or reflector layer, 7 lies behind the light source(s) 4, and between the light source(s) 4 and a back of the sign 1. The reflector 7 is light-colored (e.g. white), and/or shiny/reflective, and is arranged to reflect light reaching it from the light source(s) 4 forward, so increasing sign brightness. The reflector 7 may simply be an opaque, and preferably shiny/gloss finish, white film in some implementations. The reflector 7 may comprise a photoluminescent material in some embodiments, so providing a hybrid sign 1 with both electrical and photoluminescent emissions.

The reflector 7 may be provided by a light-colored and/or reflective coating on the forward face of the base 2 in some embodiments, although it is a separate layer 7 located in front of the batteries 5 in the examples pictured. In some embodiments, the reflector 1 could have a white background with the symbols 8 of the marker layer 6 printed on it (e.g. in red or green) or may be a non-white color (e.g. red or green) with the symbols 8 printed on it in white. All areas of the reflector 7 may be shiny, irrespective of color, to increase light reflection from it.

In other embodiments, no reflector layer 7 may be provided.

Figure 2:
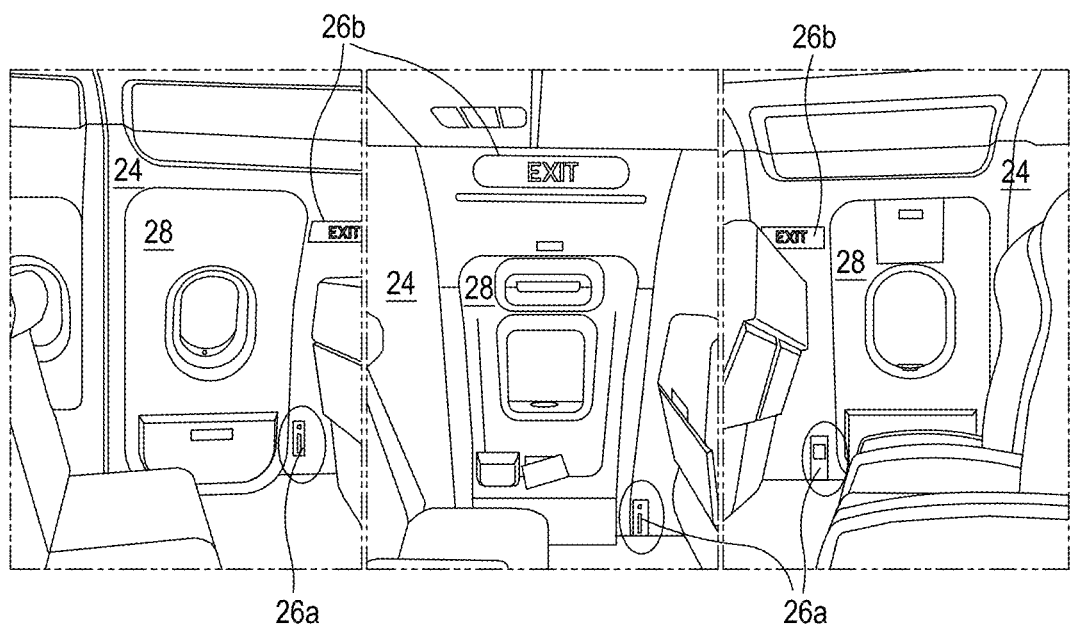
FIG. 2 (Prior Art) provides examples of three prior art cabins with integrated electrical low-level and high-level exit signs, demonstrating general positioning and dimensions thereof.

FIG. 2 (prior art images) shows three examples of aircraft cabin emergency exits 28 with electrical exit signs 26—in particular, these cabins 20 each have a "low-level" exit sign 26a and a higher-level exit sign 26b for each emergency exit door 28.

The higher-level exit signs 26b are generally located on a wall 24 (including cabin dividers and other walls such as lavatory or galley walls, as well as aircraft walls, i.e. cabin sidewalls) or ceiling of the cabin 20, often near or adjacent to an upper side of the emergency exit door 28—for example being centrally located above the door 28, or located adjacent to or near an upper corner of the door 28. High-level exit signs 26b may also be provided further from the exits, directing passengers towards the exits.

The low-level exit signs 26a are generally located on a sidewall 24 of the cabin 20, near or adjacent to a lower corner of the emergency exit door 28. Low-level exit signs are located less than 122 cm (48 inches) above a floor of the aircraft cabin 20, and generally less than 50 cm or 30 cm above the floor. Low-level exit signs generally form part of, or are associated with, floor-path emergency route markings, such that, in case of an emergency with poor visibility (e.g. due to smoke and/or failure of the main cabin lights), a passenger following the floor-path markings will be guided to an emergency exit 28 marked with such a sign 26a. The low-level exit signs 26a are located below the tops of chairs provided for passengers, and often (as shown in the central and right-hand examples of FIG. 2) at or below the seat level such that they are level with a passenger's lower legs when seated. The low-level exit signs 26a are generally located on, or at least substantially parallel to, a cabin wall 24, facing into the cabin 20.

Figure 6:
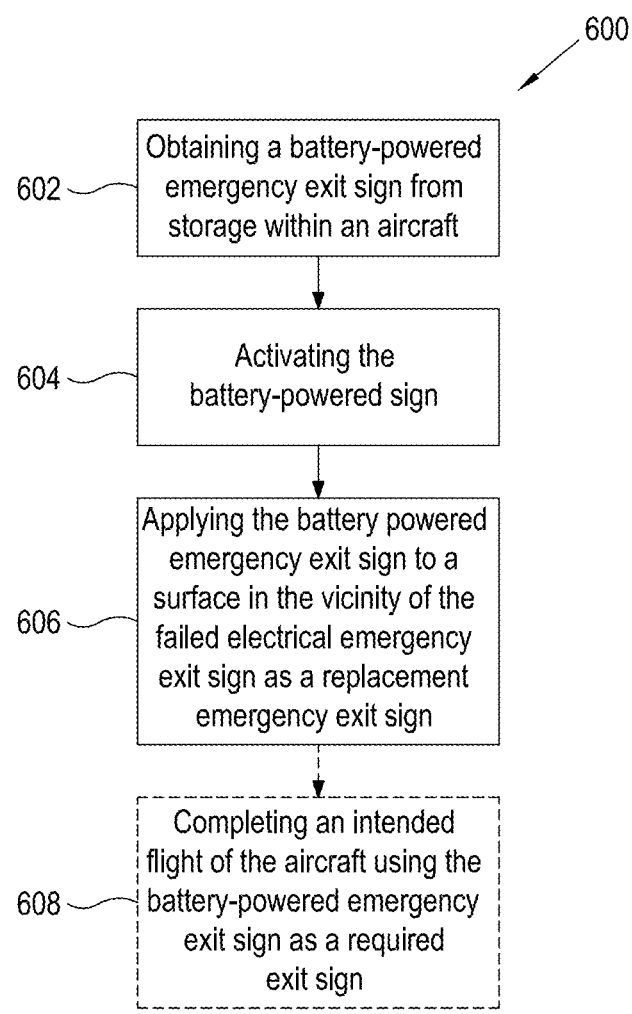
FIG. 6 illustrates methods of various embodiments.

Various methods 600 of embodiments of the invention are illustrated in FIG. 6.

A method 600 of providing emergency exit lighting in an aircraft cabin 20 comprises, in response to failure of a cabin electrical emergency exit sign 26, obtaining 602 a battery-powered emergency exit sign 1 from storage.

The battery-powered emergency exit sign 1 may be obtained 602 from a storage location within the aircraft 22, and optionally within the aircraft cabin 20. Alternatively, the battery-powered emergency exit sign 1 may be made available at an airport or other facility and fetched as appropriate. Preferably, an aircraft 22 may carry a plurality of battery-powered emergency exit signs 1 as described herein, suited to its electrical emergency exit signs 26 and/or to other features of its aircraft cabin lighting system—for example, the signs 1 may be sized and shaped to fit well over, or adjacent to, the electrical emergency exit signs 26, and/or to match floor-path markings in color, and/or to have use lifespans suitable for the aircraft's flights.

The method 600 further comprises activating 604 the battery-powered sign 1. Activation comprises, and may consist of, allowing an electrical connection to be made between the one or more batteries 5 and the one or more light sources 4, for example by removing a battery isolator, so allowing the battery 5 to power the light source 4, or pressing an "on" switch. Activation 604 may therefore take a matter of seconds, or indeed less than a second. Activation 604 may comprise inserting batteries 5 into the sign 1 in some embodiments, although the batteries are sealed within the sign 1 and not replaceable in other embodiments.

The method 600 further comprises applying 606 the temporary emergency exit sign 1 to a surface in the vicinity of the failed electrical emergency exit sign 26a such that the adhesive layer 3 holds the temporary emergency exit sign 1 in place as a replacement emergency exit sign. This may be referred to as positioning 606 or mounting 606 the sign 1. The surface may be a cabin wall 24, or indeed a surface of the failed electrical emergency exit sign 26a.

The or each battery-powered temporary emergency exit sign 1 comprises an adhesive layer 3 arranged to allow the temporary emergency exit sign 1 to be adhered to a surface, such as a cabin wall 24 or a (failed) emergency exit sign 26. Applying 606 the temporary emergency exit sign 1 to the surface may therefore comprise peeling off, or otherwise removing, a cover layer protecting/covering the adhesive material 3 and pressing the sign 1 into position, for example smoothing the sign 1 into place by hand in the desired location.

The adhesive layer 3 of the temporary emergency exit sign 1 may be applied 606 to a surface of the failed electrical emergency exit sign 26a. The electrical emergency exit sign 26a may therefore be partially or completely covered by the temporary emergency exit sign 1. Advantageously, this may prevent any confusion from two exit signs being visible (in normal lighting conditions) were the temporary emergency exit sign 1 instead placed adjacent to or nearby to the failed permanent sign 26.

The activation step 604 may be performed before or after the step 606 of positioning the sign 1, provided that the battery isolator or switch is accessible from a front of the sign 1. It may be preferable to have the switch or isolator on the back of a sign 1 to reduce or eliminate the risk of passenger tampering. In embodiments with a removable pull-tab, this pull tab may extend through a thin slit in the frame 10 and may be fully removed from the sign 1 and discarded, preventing reinsertion. The pull-tab may extend from a side of the sign 1, so allowing it to be removed before or after sign installation.

Conveniently, having an easily portable temporary emergency exit sign 1 which can be easily applied to a surface and activated allows any member of cabin crew to rectify a failed emergency light, without specialist training or tools, so allowing a flight to continue.

Each temporary emergency exit sign 1 may have a weight of no more than 500 g, and optionally no more than 400 g, 300 g, 200 g, 150 g or 100 g. For example, a typical sign 1 may have a weight of around 120 g. It will be appreciated that sign weight generally depends on the sign size, and also on the number and type of batteries (or other power sources 5) required to power that sign, and the number and type of light sources 4. In general, the power source(s) 5 may contribute 30% or more of the sign's weight. Typically, signs 1 as described herein may have a total mass, including the power source(s) 5, of around 1-10 g or 1-5 g per $cm^2$ of sign area, and optionally around 1-2 g per $cm^2$ of sign area.

For example, a sign with dimensions (l×w×d) of 130 mm×70 mm×14 mm may have a mass of around 65 g without the power source(s). Two AA batteries 5 and a battery holder may then be added to power the sign 1, adding a mass of around 55 g. The total sign mass may therefore be around 120 g.

The method 600 may therefore allow an aircraft 22 to be "repaired" so as to meet safety standards relating to numbers of emergency signs in a relatively short time-period, without highly technically-trained staff, and/or without needing to return the aircraft to a service point. The aircraft 22 may therefore be allowed to complete its intended flight, with little or no delay to the intended departure time (depending on how quickly the fault is noted a temporary sign 1 obtained and set).

The method 600 of providing emergency exit lighting in an aircraft cabin 20 may form part of a method of maintaining flight-worthiness of a passenger aircraft 22 in instances of failure of a standard, wired ("permanent") emergency exit sign 26 such that the aircraft 22 can be flown back to a service point. The method 600 may therefore further comprise completing 608 an intended flight of the aircraft 22 using the temporary emergency exit sign 1 as a required exit sign, in place of a failed exit sign.

The method 600 may further comprise servicing the aircraft 22 to repair or replace the failed wired electrical emergency exit sign 26 in advance of a next flight of the aircraft.

The battery-powered sign 1 as described herein is generally used for a single flight only (or perhaps two relatively short "hops" with a minimal stop-over therebetween). The battery-powered sign 1 is selected to store sufficient power to keep emitted light levels above the minimum required by the standards for the duration of the flight, but its emitted light level may drop below that required minimum thereafter as the battery's state of charge decreases, especially in scenarios in which a temporary sign 1 is used for a flight/usage period of over 6-10 hours. Due to the sign 1 being desirably thin and light weight, the battery capacity may be limited. For example, the sign 1 may not contain enough power to be used for more than 12, 18, or 24 hours.

The temporary emergency exit sign 1 may be detached from the failed emergency exit sign 26 prior to servicing. In some cases, the adhesive layer 3 may be selected such that the sign 1 peels off cleanly, and the sign 1 may be re-useable (following recharging or replacement of the one or more batteries 5). In other cases, the sign 1 may be designed for one-shot use, and may not be intended to be re-usable.

What is claimed is:

1. An aircraft cabin lighting system comprising at least one cabin lighting unit, each cabin lighting unit comprising an emergency exit sign connected to an aircraft electricity supply; and at least one replacement emergency exit sign for temporary use, the replacement emergency exit signs each being internally-powered and portable, comprising at least one electric light source, at least one energy storage device arranged to power the at least one light source, and an adhesive layer arranged to allow the replacement emergency exit signs to be adhered to a surface, and being arranged, in use, to be adhered to a surface in the vicinity of the emergency exit sign connected to the aircraft electricity supply.

2. The aircraft cabin lighting system of claim 1, wherein the at least one replacement emergency exit sign is not connected to any aircraft electricity supply.

3. The aircraft cabin lighting system of claim 1, wherein the at least one replacement emergency exit sign is flexible such that it can adapt to the shape of a surface to which it is applied.

4. The aircraft cabin lighting system of claim 1, wherein the at least one replacement emergency exit sign is sized and shaped to cover the emergency exit sign connected to the aircraft electricity supply when the adhesive layer is applied thereto.

5. The aircraft cabin lighting system of claim 1, wherein the adhesive layer is arranged to be detachable from the surface of the emergency exit sign connected to the aircraft electricity supply, such that the replacement emergency exit sign can be temporarily installed, and then removed.

6. The aircraft cabin lighting system of claim 1, wherein the replacement emergency exit sign comprises at least one exit identifier arranged to be lit by the at least one electric light source.

7. The aircraft cabin lighting system of claim 6, wherein the exit identifier comprises at least one word and/or symbol which is illuminated on a darker background, and wherein a contrast between brightest and darkest elements is at least 10:1.

8. The aircraft cabin lighting system of claim 6, wherein each replacement emergency exit sign comprises a diffuser layer, and the exit identifier is printed onto the diffuser layer.

9. The aircraft cabin lighting system of claim 1, wherein each replacement emergency exit sign comprises a reflector behind the at least one electric light source.

10. The aircraft cabin lighting system of claim 1, wherein each replacement emergency exit sign comprises a light guide arranged to reduce formation of bright spots in use.

11. The aircraft cabin lighting system of claim 1, wherein each replacement emergency exit sign comprises a plurality of light-emitting diodes—LEDs—as the electric light source, and wherein the LEDs are spaced apart by a distance of no more than 15 mm.

12. The aircraft cabin lighting system of claim 11, wherein the LEDs are positioned along at least a portion of a perimeter of the replacement emergency exit sign, facing inwardly, such that the sign is edge-lit.

13. The aircraft cabin lighting system of claim 1, wherein the at least one energy storage device is arranged to hold sufficient energy to power the at least one electric light source for a period of at least 12 hours, and wherein the energy storage device comprises at least one battery.

14. The aircraft cabin lighting system of claim 1, wherein each replacement emergency exit sign comprises an isolator arranged to be removed from the replacement emergency exit sign to activate the replacement emergency exit sign, wherein the isolator is arranged to electrically separate the at least one energy storage device from the at least one light source.

15. The aircraft cabin lighting system of claim 14, wherein removing the isolator is arranged to leave a visual indicator that the replacement emergency exit sign has been used.

16. A method of providing emergency exit lighting in an aircraft cabin, the method comprising, in response to failure of an emergency exit sign connected to an aircraft electricity supply:
obtaining an internally-powered emergency exit sign from storage, the internally-powered emergency exit sign comprising an adhesive layer arranged to allow the internally-powered emergency exit sign to be adhered to a surface;
activating the internally-powered emergency exit sign; and
applying the internally-powered emergency exit sign to a surface in the vicinity of the failed emergency exit sign such that the adhesive layer holds it in place as a replacement emergency exit sign.

17. The method of claim 16, wherein the adhesive layer of the internally-powered emergency exit sign is applied to a surface of the failed emergency exit sign, such that the failed emergency exit sign is at least partially covered.

18. A method of maintaining flight-worthiness of a passenger aircraft in instances of failure of an emergency exit sign connected to an aircraft electricity supply such that the aircraft can be flown back to a service point, the method comprising:
in response to the failure of an electrical emergency exit sign, obtaining an internally-powered emergency exit sign from storage, the internally-powered emergency exit sign comprising an adhesive layer arranged to allow the internally-powered emergency exit sign to be adhered to a surface;
activating the internally-powered emergency exit sign;
applying the internally-powered emergency exit sign to a surface in the vicinity of the failed emergency exit sign such that the adhesive layer holds it in place as a replacement emergency exit sign;
completing an intended flight of the aircraft using the internally-powered emergency exit sign as a required exit sign; and
servicing the aircraft to repair or replace the failed emergency exit sign in advance of a next flight of the aircraft.

19. The method of claim 18, wherein the adhesive layer of the internally-powered emergency exit sign is applied to a surface of the failed emergency exit sign, such that the failed emergency exit sign is at least partially covered.

20. The method of claim 18, wherein the method further comprises detaching the internally-powered emergency exit sign from the failed emergency exit sign prior to servicing.

\* \* \* \* \*